(12) United States Patent
Leek et al.

(10) Patent No.: US 11,458,741 B2
(45) Date of Patent: Oct. 4, 2022

(54) METHOD FOR APPLYING AN IMAGE

(71) Applicant: Canon Production Printing Holding B.V., Venlo (NL)

(72) Inventors: Kimball M. Leek, Venlo (NL); Clemens T. Weijkamp, Venlo (NL); Pim Van Der Asdonk, Venlo (NL); Luc Van Keulen, Venlo (NL)

(73) Assignee: CANON PRODUCTION PRINTING HOLDING B.V., Venlo (NL)

(*) Notice: Subject to any disclaimer, the term of this patent is extended or adjusted under 35 U.S.C. 154(b) by 94 days.

(21) Appl. No.: 17/036,450

(22) Filed: Sep. 29, 2020

(65) Prior Publication Data

US 2021/0138798 A1    May 13, 2021

(30) Foreign Application Priority Data

Nov. 12, 2019  (EP) .................................. 19208635

(51) Int. Cl.
*B41J 11/00* (2006.01)
*B41J 2/21* (2006.01)

(52) U.S. Cl.
CPC .......... *B41J 11/002* (2013.01); *B41J 2/2103* (2013.01)

(58) Field of Classification Search
CPC ............................. B41J 11/002; B41J 2/2103
See application file for complete search history.

(56) References Cited

U.S. PATENT DOCUMENTS

| | | |
|---|---|---|
| 2013/0127960 A1 | 5/2013 | Edwards |
| 2014/0285558 A1 | 9/2014 | Wada et al. |
| 2016/0023480 A1 | 1/2016 | Heath |

FOREIGN PATENT DOCUMENTS

| | | |
|---|---|---|
| EP | 2 840 119 A1 | 2/2015 |
| EP | 3 517 582 A1 | 7/2019 |
| JP | 2017-1288 A | 1/2017 |
| WO | WO-2020008508 A1 * | 1/2020 |

OTHER PUBLICATIONS

European Search Report, issued in Application No. 19 20 8635, dated Apr. 30, 2020.

* cited by examiner

*Primary Examiner* — Justin Seo
(74) *Attorney, Agent, or Firm* — Birch, Stewart, Kolasch & Birch, LLP

(57) ABSTRACT

The present invention relates to a method for applying an image onto a recording medium. Using the method according to the present invention, images may be printed having a predetermined gloss. The method further enables to make prints having local differences in gloss level. The present invention further relates to an ink-jet printing apparatus.

10 Claims, 4 Drawing Sheets

METHOD FOR APPLYING AN IMAGE

The present invention relates to a method for applying an image onto a recording medium. The present invention further relates to an ink-jet printing apparatus.

BACKGROUND OF THE INVENTION

Methods for printing images using radiation-curable ink are well known in the art. In such methods, an image is formed by applying droplets of a radiation-curable ink onto a recording medium and curing the ink. Curing of the ink can be done by irradiating the ink with suitable radiation, for example ultraviolet radiation. Robust images may be formed using such methods.

US2013/0127960 describes a method for printing an image using radiation-curable ink. After curing of the ink, an overcoat is applied on top of the image to change the gloss of the image.

A disadvantage of these known methods is that adjustment of the gloss level of the printed image is either not possible, or requires post-processing, such as application of an overcoat. However, there is a need for making prints with an adjustable gloss level without post-processing. For example, for outdoor applications generally a high gloss level is desired. For indoor applications, lower gloss levels are preferred. For wall paper, low gloss levels (i.e. matt) are preferred. For some applications, an intermediate gloss level, such as satin gloss, are preferred. If the gloss cannot be adjusted, it may not be possible to make prints for a plurality of applications on a single printing system. It is thus preferred to be able to adjust the gloss level for different print jobs.

It is therefore an object of the invention to provide a method for printing images, wherein an image can be printed with a variable gloss level. It is a further object of the invention to provide an ink jet printer configured to perform such method.

SUMMARY OF THE INVENTION

The object of the invention is achieved in a method for applying an image onto a receiving medium, the method comprising the steps of:
  a) Determining the desired gloss of the image;
  b) Based on the desired gloss, determining an amount of radiation-curable ink comprising a colorant and an amount of radiation-curable ink not comprising a colorant to be locally applied onto the recording medium, wherein both the ink comprising a colorant and the ink not comprising a colorant comprise a gelling agent;
  c) Locally applying the ink onto the recording medium, wherein the ink is applied such that the amounts of ink comprising a colorant and ink not comprising a colorant are as determined in step b);
  d) curing the radiation-curable ink.

Gloss is an optical property which indicates how well a surface reflects light in a specular (mirror-like) direction. It is one of important parameters that are used to describe the visual appearance of an object. A user of a printing system may determine the desired gloss of the image. Alternatively, the desired gloss may be determined by a computer program based on one or more parameters, such as type of application or type of media. The gloss may be selected from a list. The list may be stored on storage means and may be retrieved by a user, for example via the interface of a controller of the printer, or via a computer that is in communication with the printer. Alternatively, the gloss may be manually selected by an operator and inserted into the printer.

In a further alternative, the gloss may be retrieved from levels stored in a look-up table, wherein desired flexibilities are stored for a plurality of applications.

In the method according to the present invention, in step b. an amount of radiation-curable ink comprising a colorant and an amount of radiation-curable ink not comprising a colorant to be locally applied onto the recording medium is determined based on the determined gloss level. In the method according to the invention, images may be formed by applying predetermined patterns of ink onto the recording medium, wherein ink comprising a colorant is applied and optionally an ink not comprising a colorant is applied.

It was surprisingly found that applying an ink not comprising a colorant in addition to ink comprising a colorant affects the gloss of the formed image. The level of gloss may be influenced by choosing a certain amount of ink not comprising a colorant in addition to ink comprising a colorant. Therefore, in the method according to the present invention, an amount of radiation-curable ink comprising a colorant is determined and an amount of radiation-curable ink not comprising a colorant is determined to be locally applied onto the recording medium. One of the possible settings selectable in the method according to the present invention is not applying any ink not comprising a colorant. Both the ink comprising a colorant and the ink not comprising a colorant comprise a gelling agent. Gelling agents are also known in the art as gellants or thickeners. The presence of a gellant can cause a viscosity increase in the inkjet ink composition upon cooling of the ink composition. The viscosity increase in the ink composition should be sufficient, to adequately control droplet spreading.

Examples of gelling agents used in gelling radiation curable inkjet ink compositions are waxes, such as natural waxes and long chain carboxylic acids, and ketones. Because gelling inks have reduced spread of ink on the recording medium, due to their gelling property, it may not be necessary to cure the ink droplets immediately after applying them onto the recording medium. It is possible to keep the droplets in an uncured state on the recording medium, without color bleeding occurring. However, it is not necessary to postpone curing of the radiation-curable gelling ink after application onto the recording medium; the ink may be cured—fully or partially—immediately after application onto the recording medium.

Thus, radiation-curable gelling ink may provide images free of color bleed, or bleeding of ink comprising a colorant into ink not comprising a colorant, in combination with a variety of curing strategies. Therefore, radiation-curable gelling ink may be suitably used in the method according to the present invention.

The gelling agent may be present in an amount of from 0.1 wt % to 15 wt % based on the total weight of the ink composition, preferably from 0.2 wt % to 10 wt % based on the total weight of the ink composition, more preferably from 0.4 wt % to 5 wt % based on the total weight of the ink composition. It was surprisingly found that using a radiation-curable ink not comprising a colorant and comprising a gelling agent in addition to a radiation-curable ink comprising a colorant and comprising a gelling agent for making a prints results in lower gloss levels compared to using radiation-curable ink comprising a colorant and comprising a gelling agent and not using a radiation-curable ink not comprising a colorant and comprising a gelling agent for making prints.

In the method according to the present invention, in step c., an image is applied onto the recording medium by ejecting a predetermined pattern of droplets of ink onto the recording medium. The droplets may be applied using an ink jet print head. Examples of print heads are piezo-electric print heads or thermal print heads. The skilled person will know how to apply an image onto the recording medium by ejecting a predetermined pattern of droplets of ink onto the recording medium.

The ink may be a radiation-curable ink. Radiation-curable inks are inks that can be cured under influence of radiation, preferably electro-magnetic radiation, such as UV radiation. Radiation-curable inks may comprise radiation-curable components that undergo a polymerization reaction under influence of radiation, such as (meth)acrylates, vinylethers and epoxides. An ink composition comprising radiation-curable components may be fluid in the uncured state; i.e. a state in which the ink is not yet cured. The ink may be in the fluid state when it is jetted onto the recording medium.

In the method according to the present invention, droplets of the ink comprising a colorant and optionally—depending on the selected gloss—droplets of the ink not comprising a colorant are applied. The amount of ink applied may be determined by determining the number and/or volume of the droplets applied. The droplets of ink comprising a colorant and the droplets of ink not comprising a colorant may be applied adjacent to one another and/or on top of one another. In case the image is printed in a plurality of layers, each of these layers may be built up by jetting droplets of ink comprising a colorant and droplets of ink not comprising a colorant.

In the method according to the present invention, in step d. the ink is cured. By curing the ink, the ink layer may be fixed onto the recording medium and a robust ink surface may be formed on the recording medium. By curing the ink according to the selected curing settings, the ink surface may be fixed. Curing of the ink may be performed by heating the ink and/or irradiating the ink with suitable radiation. Irradiation with ultraviolet radiation is preferred.

After curing of the ink, an image is formed having the desired gloss. The gloss level may be any gloss level from high gloss to low gloss, or a gloss level in between.

In an embodiment, in step c the total amount of ink applied locally is 5 mg/cm$^2$ or more. Preferably, the total amount of ink applied locally is 7 mg/cm$^2$ or more. More preferably, the total amount of ink applied locally is 8 mg/cm$^2$ or more. The total amount of ink locally applied is the sum of the amount of radiation-curable ink comprising a colorant locally applied and the amount of radiation-curable ink not comprising a colorant locally applied. When the total amount of ink applied is 5 mg/cm$^2$ or more, the coverage of the recording medium may be sufficient to prevent the gloss level of the print to be influenced by the gloss level of the recording medium.

In a further embodiment, the gelling agent is an ester obtainable by a condensation reaction between a fatty acid and a component selected from the group consisting of pentaerythritol, cyclodextrine, glycerol, dipentaerythritol, 2-(hydroxymethyl)-2-methylpropane-1,3-diol, 2-ethyl-2-(hydroxymethyl)propane-1,3-diol, 2-(hydroxymethyl)propane-1,3-diol, trimethylolethane, trimethylolpropane, trimethylolbutane and trimethylolpentane.

In an embodiment, step d) is started after all ink has locally been applied.

After application onto the recording medium, the ink may cool down and an increase in viscosity may occur. The viscosity increase may be the result of crystallization of one or more components in the ink, in particular the gellant. It is preferred to allow crystallization to occur, before curing the ink. Therefore, preferably all ink is applied on an area before the ink in that area is cured.

In an embodiment, the amount of ink not comprising a colorant decreases with increasing gloss level.

The higher the amount of ink not comprising a colorant that is applied in an area, the lower the gloss level of the image in that area. An image having a low gloss level is a matt image. If no ink not comprising a colorant is applied, the gloss may be very high. The gloss of an image may be determined using a micro-TRI gloss meter obtained from BYK-Gardner GmbH using the internal calibration and measurement method.

In an embodiment, the ink is applied using a scanning ink jet printer and wherein the ink comprising a colorant and the ink not comprising a colorant are ejected simultaneously onto the recording medium.

A scanning inkjet may comprise a print head carriage that is moved over the recording medium in reciprocation in a main scanning direction. The main scanning direction may be perpendicular to a direction of transport of the recording medium. At least one print head may be mounted on the carriage. The at least one print head may be configured to eject in printing operation different types of ink, such as ink comprising a colorant and ink not comprising a colorant. Alternatively, the print head carriage may carry a plurality of print heads, each one of the print heads being configured to eject one specific type of ink. For example, the carriage may carry a print head configured to eject ink comprising a yellow colorant, a print head configured to eject ink comprising a cyan colorant, a print head configured to eject ink comprising a magenta colorant, a print head configured to eject ink comprising a black colorant and a print head configured to eject ink not comprising a colorant. When the print head carriage moves in reciprocation over the recording medium, the print heads mounted on the carriage may eject droplets of ink onto the recording medium, thereby building an image onto the recording medium. Using such configuration, the ink comprising a colorant and the ink not comprising a colorant can be applied simultaneously and droplets of the two types of ink may be positioned adjacent to one another.

In a further embodiment, the ink comprising a colorant and the ink not comprising a colorant are ejected onto the recording medium in a plurality of swaths and wherein in every swath both ink comprising a colorant and the ink not comprising a colorant are ejected.

In this embodiment, droplets of ink comprising a colorant and droplets of ink not comprising a colorant can be placed in close proximity of one another, both within a layer of ink and also between different layers of ink formed in the different swaths. The ink not comprising a colorant can be distributed over the entire image, allowing to efficiently adjust the gloss of the image.

In an embodiment, the ink is applied using a single pass ink jet printer, the single pass inkjet printer comprising a first print head and a second print head, the first print head being configured to eject ink not comprising a colorant, the second print head being configured to eject ink comprising a colorant, wherein the second print head is positioned downstream in a direction of media transport with respect to the first print head. Preferably, the single pass printer comprises at least a third print head, the third print head being configured to eject ink comprising a second colorant, and the second print head being configured to eject ink comprising a first colorant. The first print head is preferably positioned in between the second and the third print head in a direction of media transport. During printing, the ink not comprising the colorant may be placed in between the ink comprising the first colorant and the ink comprising the second colorant.

In an embodiment, the colorant is a pigment. The pigment may provide the ink composition with a predetermined color.

In an embodiment, the image comprising a first area and a second area, wherein the first area has a first desired gloss level and the second area has a second gloss level, wherein in step a), both the first and second gloss level are determined, in step b), a first amount of ink comprising a colorant and a first amount of ink not comprising a colorant are determined, and a second amount of ink comprising a colorant and a second amount of ink not comprising a colorant are determined; and in step c), applying the first amounts of ink in a first part of the recording medium, thereby forming the first area and applying the second amounts of ink in a second part of the recording medium thereby forming the second area.

In this embodiment, an image having local gloss differences may be formed. Within an image, different image elements may be present. An image element may be e.g. a figure, text or a line element. Different image elements may be printed having their own gloss level. For example, a figure may be printed in high gloss, whereas text may be printed matt (low gloss). Alternatively or additionally, an image may be printed having comprising two different image elements, wherein a first image element may be printed in satin gloss, and a second image element may be printed matt. Different image elements may be positioned in different areas of the recording medium.

In the method according to the embodiment, the gloss levels for both the first area and the second area are determined in step a). These gloss levels may be the same or may be different. In step b), a first amount of ink comprising a colorant and a first amount of ink not comprising a colorant are determined. These first amounts are to be applied in the first area. Further, in step b), a second amount of ink comprising a colorant and a second amount of ink not comprising a colorant are determined. These second amounts are to be applied in the second area. In step c), the first amounts (i.e. the first amount of ink comprising a colorant and the first amount of ink not comprising a colorant) are applied in a first part of the recording medium, thereby forming the first area and the second amounts (i.e. the second amount of ink comprising a colorant and the second amount of ink not comprising a colorant) are applied in a second part of the recording medium, thereby forming the second area. In step d), the ink is cured.

In an aspect of the invention, a software product is provided, the software product comprising program code on a non-transitory machine-readable medium, wherein the program code, when loaded into a controller of a printer with ink jet print heads, causes the controller to perform a method according to the invention.

In a further aspect of the invention an ink-jet printing apparatus is provided, the ink-jet printing apparatus comprising:
 a) a first jetting device configured to in operation eject radiation-curable ink comprising a colorant; and
 b) a second jetting device configured to in operation eject radiation-curable ink not comprising a colorant,
 c) a curing unit;
 d) a controller configured to control the ink-jet printer to perform a method according to the invention.

The ink-jet printing apparatus is thus configured to perform the method according to the present invention.

BRIEF DESCRIPTION OF THE DRAWINGS

The present invention will become more fully understood from the detailed description given herein below and accompanying schematical drawings which are given by way of illustration only and are not limitative of the invention, and wherein.

In the drawings, same reference numerals refer to same elements.

DETAILED DESCRIPTION OF THE DRAWINGS

Figure 1A:
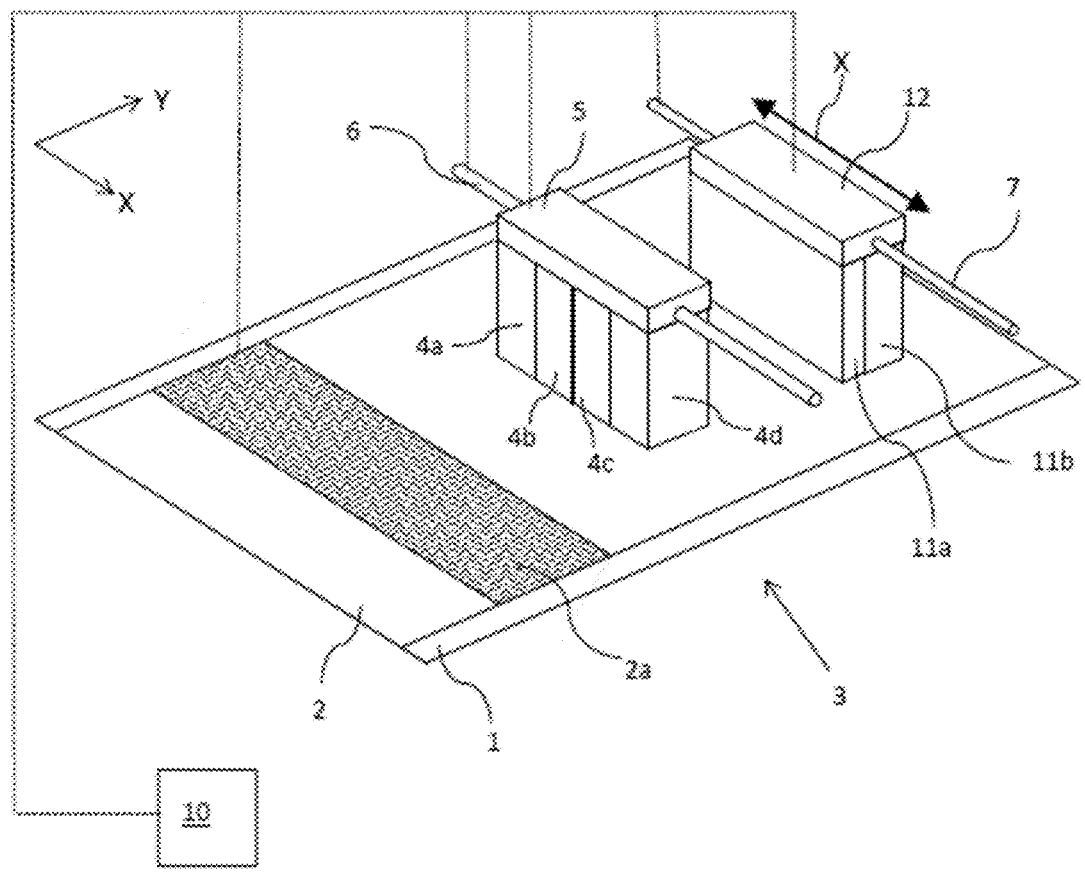
FIG. 1A shows a schematic representation of an inkjet printing system.
Figure 1B:
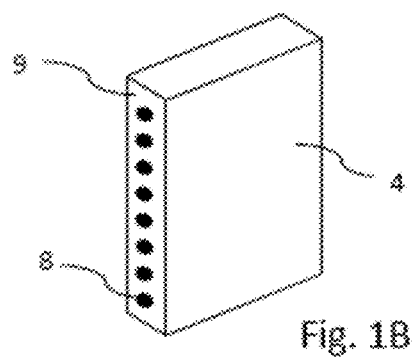
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4d, mounted on a scanning print carriage 5. The scanning print carriage 5 is guided by suitable guiding means 6 to move in reciprocation in the main scanning direction X. Each print head 4a-4d comprises an orifice surface 9, which orifice surface 9 is provided with at least one orifice 8, as is shown in FIG. 1B. The print heads 4a-4d are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4d provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the four print heads 4a-4d and may be moved in reciprocation in the main scanning direction X parallel to the platen 1, such as to enable scanning of the image receiving medium 2 in the main scanning direction X. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving medium 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4d comprises an orifice surface 9 having at least one orifice 8, in fluid communication with a pressure chamber containing fluid marking material provided in the print head 4a-4d. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4d are depicted in FIG. 1B, however obviously in a practical embodiment several hundreds of orifices 8 may be provided per print head 4a-4d, optionally arranged in multiple arrays.

As depicted in FIG. 1A, the respective print heads 4a-4d are placed parallel to each other. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11a, 11b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11b may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having intensity different from the other.

The flat surface 1, the temperature control means, the carriage 5, the print heads 4a-4d, the carriage 12 and the first and second curing means 11a, 11b are controlled by suitable controlling means 10.

Figure 2:
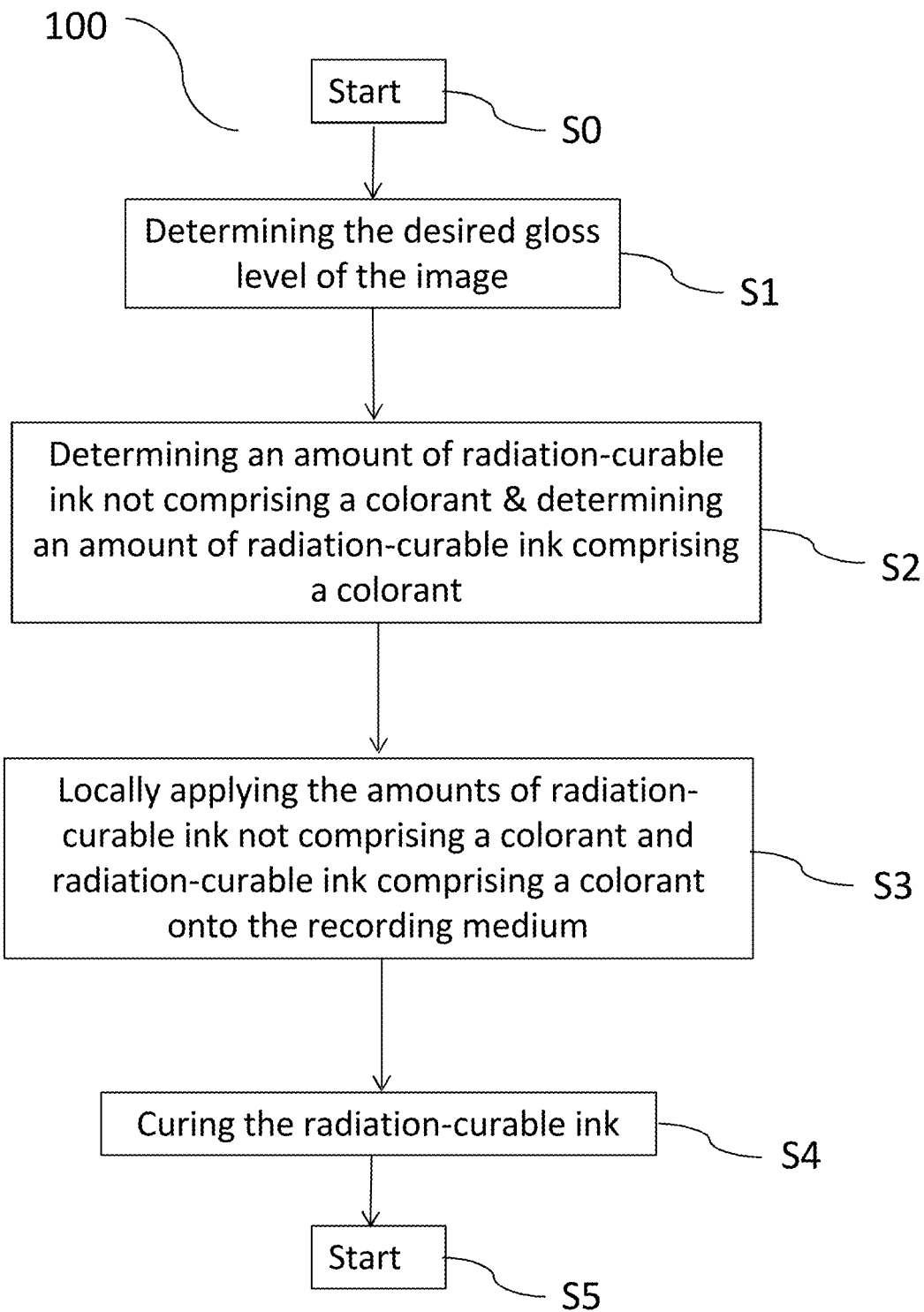
FIG. 2 is a flow diagram showing a first method according to the invention.

FIG. 2 is a flow diagram showing a first method according to the invention. The method starts at S0. In S1, the desired gloss level of the image is determined. The desired gloss level may be determined e.g. by an algorithm executed on a computer that is operatively connected to the print system or by a user, who may input the value of the desired gloss level e.g. via a user interface. The user interface may be part of the printing system or may be operatively connected to the printing system.

In S2, an amount of radiation-curable ink not comprising a colorant is determined and an amount of radiation-curable ink comprising a colorant is determined. The amounts of ink are determined based on the desired gloss level. Based on the desired gloss level, a system may determine an amount of ink comprising a colorant and an amount of ink not comprising a colorant. This may be done for example by using a look-up table or an algorithm.

In S3, the amounts of radiation-curable ink not comprising a colorant and radiation-curable ink comprising a colorant are locally applied onto the recording medium. The ink may be applied using suitable applicators. Preferably, the inks are applied using an inkjet print head. The inks may be applied using a single print head that is configured to eject different types of ink or the inks may be applied using at least two print heads. In S4, the ink is cured. Curing of the ink may result in a finished print (S5).

EXPERIMENTS AND EXAMPLES

Materials
SR 306 (a difunctional tripropylene glycol diacrylate), SR 307 (a difunctional polybutadiene diacrylate), SR355 (a tetrafunctional acrylate) and SR 351 (a trifunctional acrylate) were obtained from Sartomer. Pentaerythritoltetrastearate was obtained from NOF as WE-6. Irgacure 819 was obtained from BASF. UVgel 460 inks—commercially available for use with the Colorado 1650 printer—were obtained from Canon. All chemicals were used as received.

Methods
Gloss
The gloss of an image was measured after the image had been printed and cured. The gloss was measured using a micro-TRI glossmeter obtained from BYK-Gardner GmbH using the internal calibration and measurement method. The micro-TRI gloss measuring device simultaneously measures the gloss under an angle of 20°, 60° and 85°, respectively. The gloss level reported is the gloss level measured under an angle of 60°. A high value relates to a high gloss level, a low value relates to a low gloss level (matt).

Printing
Prints were made using a Colorado 1650 printer. The printer was modified by removing three adjacent print heads. The order of the colors in the print head unit was Yellow, Cyan, Magenta, Black and colorless ink. The prints were made by printing bidirectionally. Prints were made on Avery Dennison MPI 2000 recording medium in an 8-pass glossy print mode.

Ink Compositions
A radiation-curable ink composition not comprising a colorant was prepared by providing 40.0 g of SR 306, 30 g of SR 307 and 30 g of SR 351 as radiation-curable monomers, 2.5 g Irgacure 819 as a photo-initiator, 5.0 gr of pentaerythritoltetrastearate and mixing the components. This resulted in a colorless ink, which is an ink not comprising a colorant.

Commercially available inks UVgel 460 were used as ink compositions comprising a colorant. Four different UVgel 460 ink compositions were used; cyan UVgel 460, magenta UVgel 460, yellow UVgel 460 and black UVgel 460.

Examples

Example 1

Prints were made by applying a layer of ink in a specific color onto the recording medium. In some prints, an additional amount of colorless ink was applied onto the recording medium. The colorless ink was applied in an amount varying from 0 mL/m² to 15 mL/m².

Black, Cyan, Magenta, Yellow, Red, Green and Blue was applied onto the recording medium. These colors were applied by applying the following inks in the following amounts:

TABLE 1

| Print examples | | | | |
|---|---|---|---|---|
| | black UVgel 460 | cyan UVgel 460 | magenta UVgel 460 | yellow UVgel 460 |
| Black | 7.7 mL/m² | 0 | 0 | 0 |
| Cyan | 0 | 7.7 mL/m² | 0 | 0 |
| Magenta | 0 | 0 | 7.7 mL/m² | 0 |
| Yellow | 0 | 0 | 0 | 7.7 mL/m² |
| Red | 0 | 0 | 7.7 mL/m² | 7.7 mL/m² |
| Green | 0 | 7.7 mL/m² | 0 | 7.7 mL/m² |
| Blue | 0 | 7.7 mL/m² | 7.7 mL/m² | 0 |

The amount of colored ink applied onto the recording medium per unit area was kept constant and the amount of colorless ink (i.e. ink not comprising a colorant was varied). The gloss of the prints was measured and shown in table 2 and FIG. 3.

TABLE 2

| | gloss levels | | | | | | |
|---|---|---|---|---|---|---|---|
| amount of colorless ink (ml/m²) | Black | Cyan | Magenta | Yellow | Red | Green | Blue |
| 0 | 84 | 81 | 92 | 81 | 78 | 84 | 91 |
| 0.3 | 81 | 77 | 80 | 76 | 74 | 80 | 89 |
| 0.6 | 70 | 73 | 70 | 68 | 70 | 73 | 83 |
| 1.05 | 57 | 65 | 65 | 63 | 68 | 65 | 76 |
| 1.5 | 46 | 56 | 62 | 57 | 61 | 54 | 72 |
| 2.25 | 34 | 50 | 60 | 48 | 52 | 45 | 65 |
| 3 | 26 | 38 | 53 | 41 | 42 | 35 | 54 |
| 3.75 | 20 | 32 | 49 | 34 | 34 | 29 | 48 |
| 4.5 | 15 | 27 | 43 | 27 | 29 | 24 | 38 |
| 6 | 10 | 20 | 34 | 21 | 25 | 18 | 30 |
| 7.5 | 7.6 | 14 | 27 | 17 | 19 | 14 | 22 |
| 9 | 6.3 | 11 | 22 | 14 | 17 | 11 | 17 |
| 10.5 | 5.5 | 9 | 18 | 12 | 14 | 9.7 | 12 |
| 12 | 5.1 | 8.6 | 16 | 11 | 13 | 8.9 | 10 |
| 13.5 | 4.7 | 7.3 | 13 | 9.2 | 10 | 7.8 | 8.2 |
| 15 | 4.3 | 7.1 | 12 | 8.3 | 9.4 | 7.1 | 7.1 |

Figure 3:
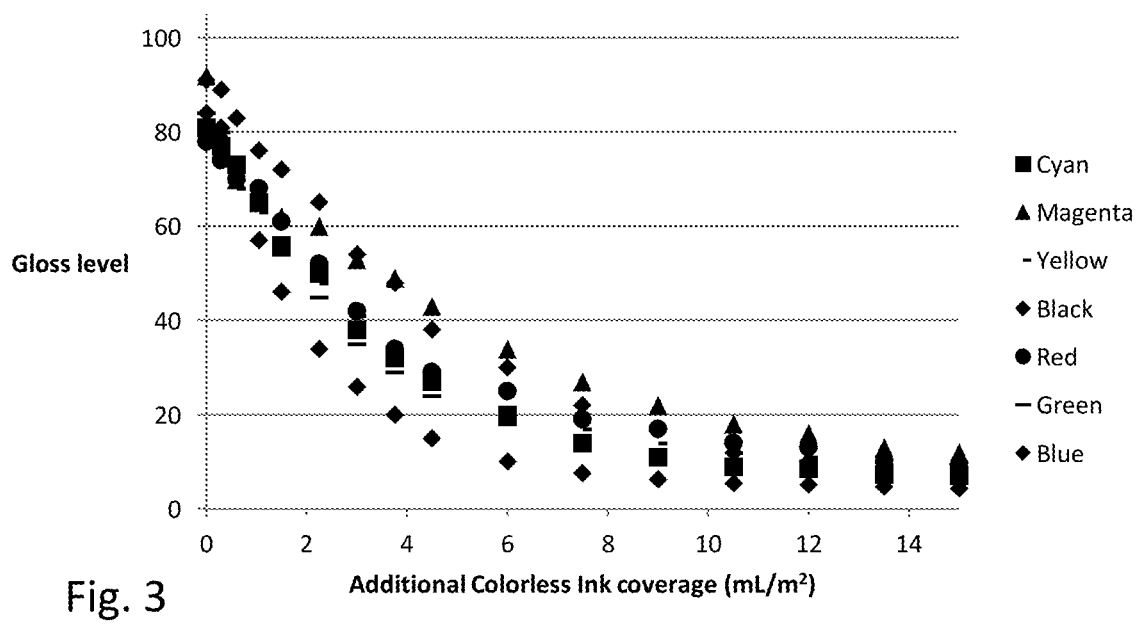
FIG. 3 is a graph showing the gloss of prints as a function of the amount of ink not comprising a colorant and refers to example 1.

The data presented in table 2 is further shown in FIG. 3. It can thus be observed, that the gloss of a print is influenced by the amount of ink not comprising a colorant applied onto the recording medium. A higher amount of ink not comprising a colorant corresponds to a lower gloss level and hence to a more matt print.

Depending on the amount of ink not comprising a colorant applied onto the recoding medium, prints can have a gloss level varying from high gloss to low gloss (matt) and gloss levels in between.

Example 2

Figure 4:
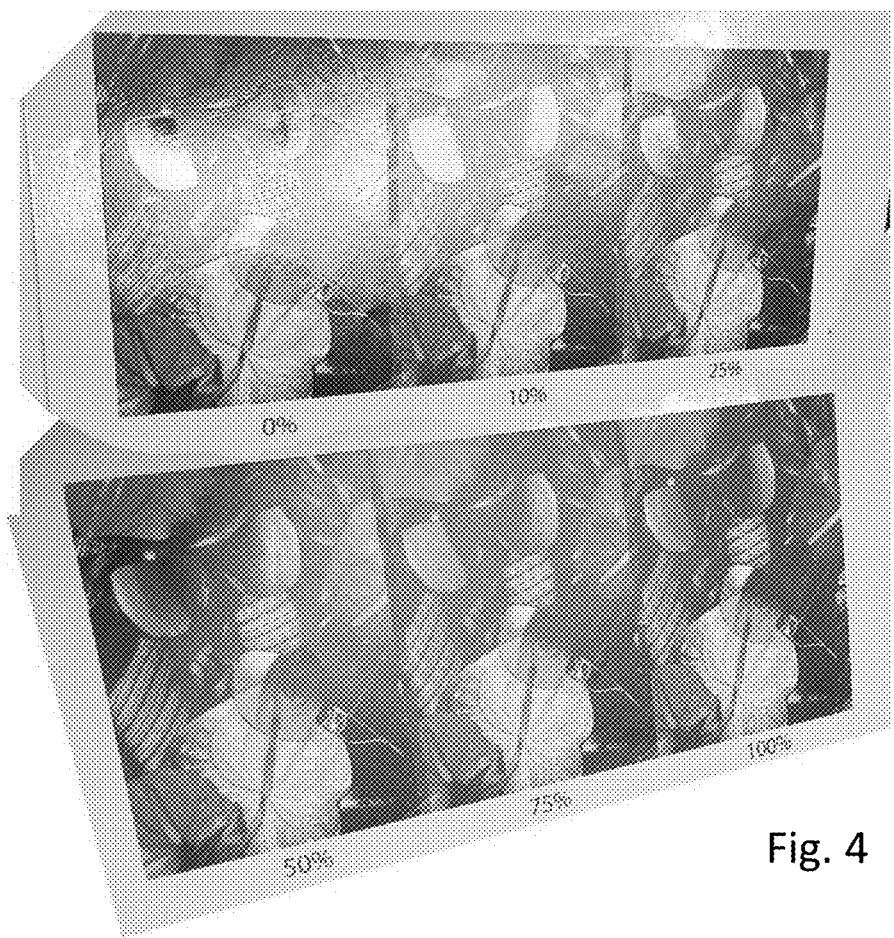
FIG. 4 shows a set of six prints printed using a method according to a first embodiment of the present invention.

FIG. 4 shows six versions of a printed image. The amount of colorless is varied among the six versions of the printed image, resulting a different glossiness.

The image designated with "0%" was printed without any colorless ink. This image has a high gloss. The image designated with "100%" was printed with 15 ml/m² of colorless ink. This image has a low gloss.

Four prints were made having an intermediate gloss. The images designated with "10%", "25%", "50%" and "75%" were printed with 1.5 ml/m², 3.75 ml/m², 7.5 ml/m² and 11.25 ml/m² of colorless ink, respectively. The higher the amount of colorless ink applied onto the recording medium, the lower the gloss of the printed image.

Example 3

Figure 5:
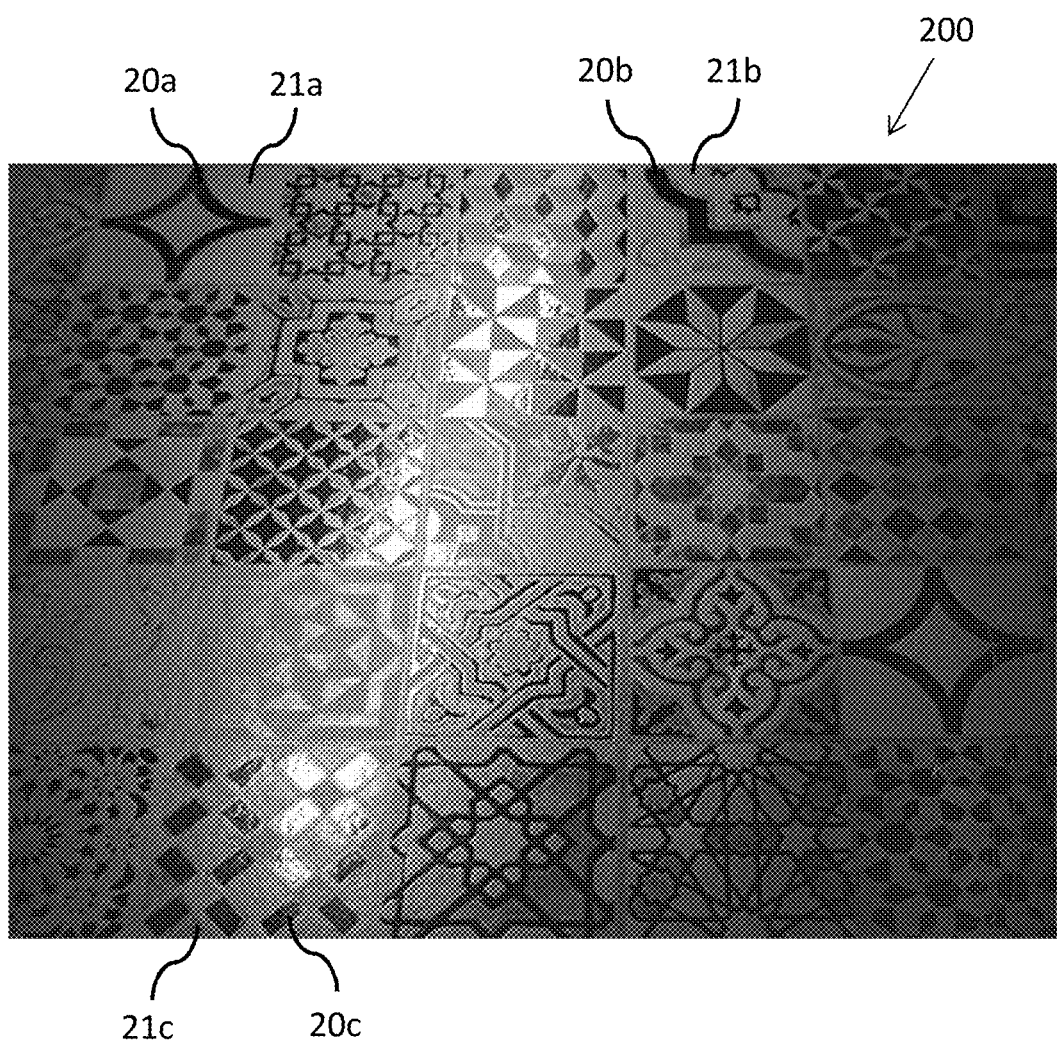
FIG. 5 shows a print printed using a method according to a second embodiment of the present invention.

FIG. 5 shows a printed image 200 having local gloss differences. The printed image 200 comprises gloss sections. In the figure, three gloss sections, i.e. sections 20a, 20b, 20c are indicated for clarity. The printed image further comprises matt sections. In the figure, three matt sections, i.e. section 21a, 21b, 21c are indicated for clarity.

The gloss sections 20a, 20b, 20c were printed by locally depositing ink black UVgel 460 and not depositing any the colorless ink. The matt sections were printed by locally depositing black UVgel 460 as well as colorless ink.

Thus, prints with local differences in gloss level can be prepared using a method according to a second embodiment of the invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for applying an image onto a receiving medium, the method comprising the steps of:
   a) determining the desired gloss of the image;
   b) based on the desired gloss, determining an amount of radiation-curable ink comprising a colorant and an amount of radiation-curable ink not comprising a colorant to be locally applied onto the recording medium, wherein both the ink comprising a colorant and the ink not comprising a colorant comprise a gelling agent;
   c) locally applying the ink onto the recording medium, wherein the ink is applied such that the amounts of the ink comprising a colorant and the ink not comprising a colorant are as determined in step b); and
   d) curing the radiation-curable ink.

2. The method according to claim 1, wherein the amount of the ink not comprising a colorant decreases with increasing gloss level.

3. The method according to claim 1, wherein step d) is started after all ink has locally been applied.

4. The method according to claim 1, wherein the ink is applied using a scanning ink jet printer and wherein the ink comprising a colorant and the ink not comprising a colorant are ejected simultaneously onto the recording medium.

5. The method according to claim 4, wherein the ink comprising a colorant and the ink not comprising a colorant are ejected onto the recording medium in a plurality of swaths,. and wherein in every swath both the ink comprising a colorant and the ink not comprising a colorant are ejected.

6. The method according to claim 1, wherein the ink is applied using a single pass ink jet printer, the single pass inkjet printer comprising a first print head and a second print head, the first print head being configured to eject the ink not comprising a colorant, the second print head being configured to eject the ink comprising a colorant, wherein the second print head is positioned downstream in a direction of media transport with respect to the first print head.

7. The method according to claim 1, wherein the colorant is a pigment.

8. The method according to claim 1, wherein the image comprises a first area and a second area, wherein the first area has a first desired gloss level and the second area has a second gloss level, wherein in step a), both the first and second gloss level are determined, in step b), a first amount of ink comprising a colorant and a first amount of ink not comprising a colorant are determined, and a second amount of ink comprising a colorant and a second amount of ink not comprising a colorant are determined; and in step c), applying the first amounts of ink in a first part of the recording medium, thereby forming the first area and applying the second amounts of ink in a second part of the recording medium thereby forming the second area.

9. A software product comprising program code on a non-transitory machine-readable medium, wherein the program code, when loaded into a controller of a printer with ink jet print heads, causes the controller to perform the method according to claim 1.

10. An ink-jet printing apparatus, the ink-jet printing apparatus comprising:
   a) a first jetting device configured to, in operation, eject radiation-curable ink comprising a colorant;
   b) a second jetting device configured to, in operation, eject radiation-curable ink not comprising a colorant;
   c) a curing unit; and
   d) a controller configured to control the ink-jet printer to perform the method according to claim 1.

* * * * *